UNITED STATES PATENT OFFICE.

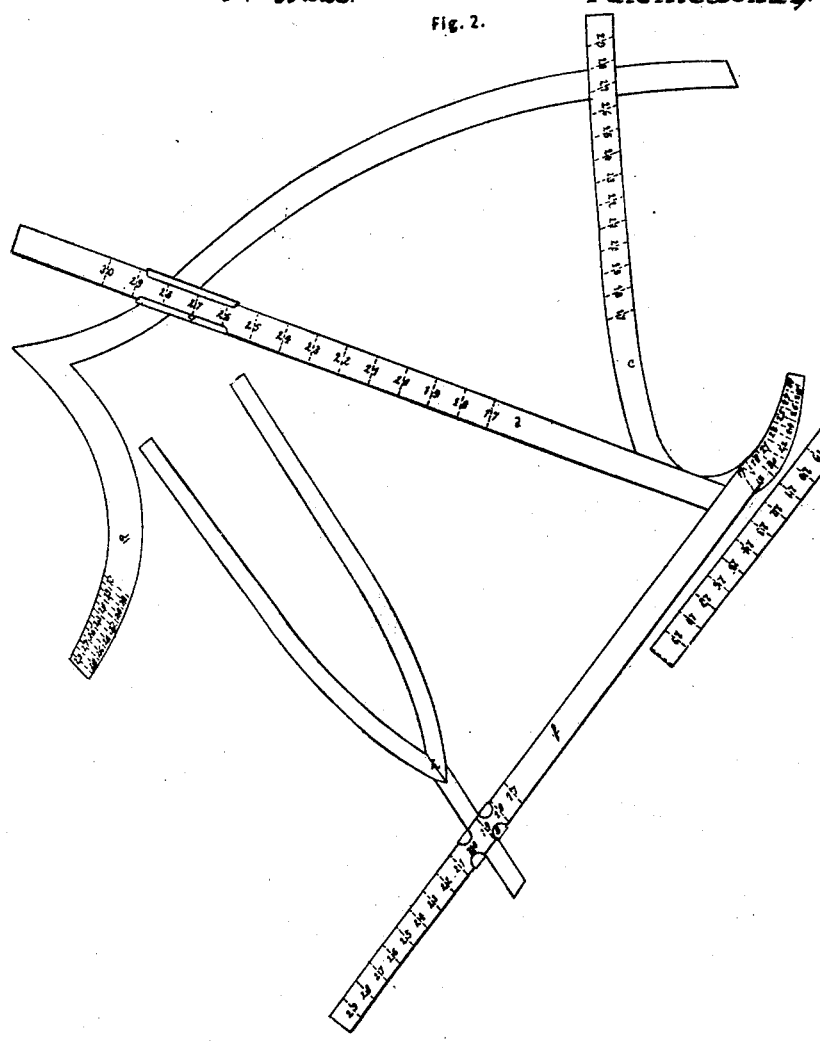
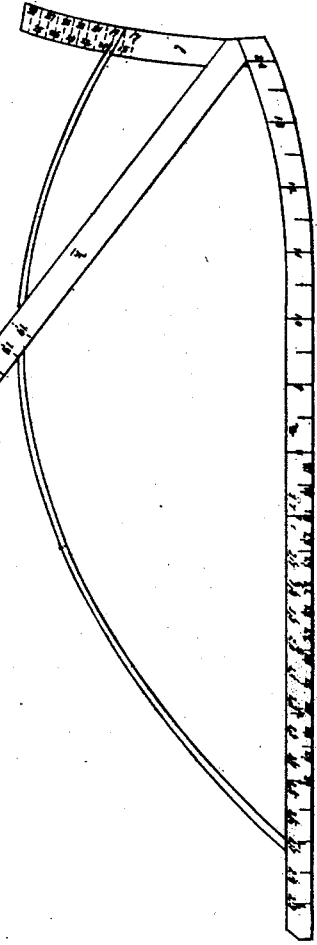

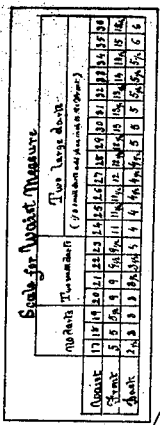

HENRY A. FOWLER, OF AFTON, NEW YORK.

INSTRUMENT FOR DRAFTING LADIES' DRESSES.

Specification of Letters Patent No. 35,226, dated May 13, 1862.

*To all whom it may concern:*

Be it known that I, HENRY A. FOWLER, of Afton, in the county of Chenango, in the State of New York, have invented a new and Improved Instrument for Drafting Ladies' Dresses; and I do hereby declare that the following is a full and exact description thereof, reference being had to the accompanying drawings and to the letters of reference marked thereon.

The nature of my invention consists in arranging and connecting in the manner represented, strips of metal or other suitable material, of a peculiar shape, and at a given angle, with slides and figures placed in such a position as to make a simple, easy, durable, and adjustable instrument for drafting ladies' dresses.

To enable others skilled in the art to make and use my invention, I will proceed to describe its construction and operation.

Figure 1, is a plan view showing the neck rule $a$, shoulder piece $b$, arm rule $c$, shoulder rule $d$, slide $e$, chest rule $f$, slide $g$, and dart $h$. The dart $h$ in the drawing is represented in a reversed position for the purpose of occupying less space when not in use. Fig. 2, is a plan view showing the form $j$, chest rule $k$, arm rule $l$, and shoulder rule $m$. The red figures and lines represent an inch rule on the opposite side of the shoulder rule $m$.

*Directions for taking the measure.*—First. Hold the end of a common tape measure on the socket bone in the back of the neck, with the left hand, and with the right hand draw the tape over the right shoulder in front and under the arm back to the place of starting, put down the number of inches, this is called the "shoulder measure" and the tape should be drawn just tight enough to allow the arm to move up and down with ease.

Second. Place the end of the tape close up under the arm pit and measure down to the bottom of the waist, this is called the "length under arm".

Third. Measure around the waist and mark that down, this is called the "waist measure" and should be a very tight measure.

To show the manner in which I draft by my instrument I have marked out a front and back on Sheet Second of drawings from the following measure: Shoulder measure twenty-six inches; length under arm seven inches; waist measure twenty-five inches.

*Directions for drafting the front.*—First. Take the inch rule and draw the line No. 1, Fig. 3, two inches from the edge of the cloth to work from.

Second. Place the bottom of the slide $e$, Fig. 1, to the figure 26 on the shoulder rule $d$, (it being the shoulder measure of the person) then find the figure 26 on the chest rule $f$, and the figure 26 on the neck rule $n$; place them both directly over the line No. 1, Fig. 3, hold the model in that position (by placing the thumb of the left hand on the chest rule $f$ and the fingers on the neck rule $a$,) while with the right hand you move the dart $h$ to the desired distance for drafting the darts 1, and 2, which is usually about one inch from the bottom of the dart to the line No. 1, and about one inch from one dart to the other, draft the darts; then draft the neck, line No. 3, then the arm, line No. 4, commencing at the figure 26 on the upper part of the arm rule $c$, and ending at the figure 26 on the lower part of the arm rule $c$.

Third. Place the finger of the left hand on the upper point of the neck rule $a$, where the neck rule $a$, and the shoulder piece $b$, are attached together, hold this point to the upper end of the line No. 3, and move the opposite end of the shoulder piece $b$, down to the upper end of the line No. 4, then draw the shoulder line No. 5, then move the shoulder piece $b$ up just the width of it and draw the line No. 6, which is the last mark made with this part of the instrument.

Fourth. Take the inch rule and measure from the lowest point under the arm (on a straight line with the cloth, as indicated by the red dotted line) down the number of inches the person measured under the arm which is seven inches make a dot $h$, and draw the line No. 7.

Fifth. In the "scale for waist measure" Fig. 5, find the waist measure of the person which is twenty-five, directly under the figures 25 you will find the width of the front eleven and one-half inches, with the inch rule measure off on the line No. 7, eleven and one-half inches from the line No. 1, Fig. 3, and make at dot $i$.

Sixth. Place the crooked end of the inch rule at the end of the line No. 4, under the arm, and move the other end up to the dot $i$ on the line No. 7, then draw the line No. 8, move the rule out about one inch from the line No. 8, and draw the line No. 9.

Seventh. Place the crooked end of the inch rule at the point where the line No. 7, and line No. 9, meet and move the other end of the rule about two inches below the point where the line No. 1, and No. 7 meet, then draw the line No. 10, which finishes the front.

*Directions for drafting the back.*—First. Take the part of the instrument on which the wire is attached and find the shoulder measure twenty-six on the chest rule $k$, and the figure 26 on the shoulder rule $m$, in the lower row of figures, place them both at the edge of the cloth; hold the instrument in that position with the left hand while you draw the arm line No. 1 and the shoulder, line No. 2, Fig. 4, commencing at the figure 26 on the arm rule $l$, and ending at the figure 26 in the upper row of figures on the shoulder rule $m$, then move the shoulder rule $m$, up just the width of it and draw the line No. 3.

Second. Draw the line No. 4, neck.

Third. With the inch rule measure down (straight with the cloth as indicated by the red dotted line) from the lower end of the arm, line No. 1, the "length under arm seven inches," make a dot $k$, and draw the line No. 5.

Fourth. Find the waist measure of the person in the "scale for waist measure" (Fig. 5) which is twenty-five; directly under the figure 25 you will find the width of the back four inches; with the inch rule measure four inches from the edge of the cloth on the line No. 5, (Fig. 4) and make a dot $m$.

Fifth. Place the crooked end of the inch rule at the lower end of the arm, line No. 1, at $n$, and move the other end up to the dot $m$ on the line No. 5 and draw the line No. 6, move the rule out about one inch from the line No. 6, and draw the line No. 7.

Sixth. Place the end of the wire which is attached to the arm rule, about one inch above the lower end of the arm line No. 1, at $o$, and the other end about one inch from the edge of the cloth on the line No. 5, at $p$, and draw the form line No. 8, which finishes the back.

The form can be varied at $o$, and $p$, to suit the taste of different persons.

N. B.—The lines should be all drawn from the outside of the instrument.

I am aware that adjustable rules for drafting garments have been heretofore used, and I do not claim such device irrespective of the construction and arrangement herein shown and described; but

I claim—

1. Connecting the chest rule $f$, shoulder rule $d$, arm rule $c$, neck rule $a$ and shoulder piece $b$, for drafting the front, as described.

2. The adjustable dart attached to the chest rule $f$, by the slide $g$.

3. Connecting the form $j$, with the chest rule $k$, arm rule $l$, and shoulder rule $m$, substantially in the manner herein set forth and described.

HENRY A. FOWLER.

Witnesses:
 CHARLES ALEXANDER,
 DARIUS DAVISON.